W. A. TURBAYNE.
SYSTEM OF ELECTRICAL DISTRIBUTION.
APPLICATION FILED NOV. 15, 1915. RENEWED JAN. 7, 1921.

1,389,463.                                    Patented Aug. 30, 1921.

Inventor
William A. Turbayne

Witnesses

By Raymond H. Van Nest
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,389,463.     Specification of Letters Patent.     Patented Aug. 30, 1921.

Application filed November 15, 1915, Serial No. 61,588. Renewed January 7, 1921. Serial No. 435,760.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Distribution, of which the following is a specification.

This invention relates to systems of electrical distribution.

This invention is an improvement on the well known Stone system of car lighting. The salient feature of the Stone system is that the generator is regulated to produce either a constant current or constant wattage by means of a belt slipping arrangement. The constant current is produced when the iron of the field structure is operated at saturation, while constant wattage is produced when the field is operated below saturation. Serious difficulties have been encountered with this system, as, for instance, overcharging of the batteries, or undercharging, if overcharging is guarded against. If it were attempted to save the battery from overcharging by opening the battery circuit when a state of full charge is reached, disaster might result, for the reason that the decreased load on the generator would cause same to speed up to a destructive point.

An object of the present invention is to provide a system of the Stone type in which the batteries will never suffer from overcharge.

Another object is to provide a system of the Stone type in which the batteries are protected while dangerous speeds are avoided.

Another object is to provide a system in which the charging current is controlled in accordance with the state of battery charge.

Another object is to embody the hereinafter described improvements in such simple form that they are readily adaptable to the existing Stone systems.

Other objects will be apparent as the description proceeds.

Referring to the drawings:—

Figure 1:
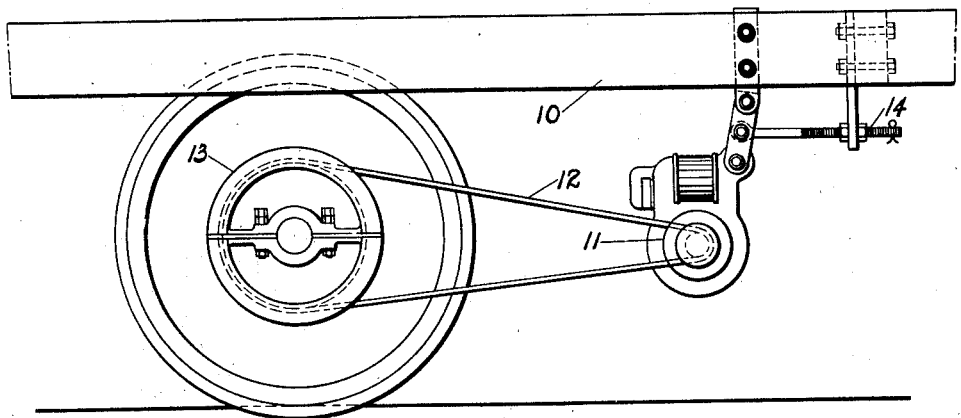
Figure 1 illustrates the manner in which the generator is mounted.

Referring first to Fig. 1, 10 indicates the body of a car. The generator 11 is suspended from the car body off-center in such a manner that its weight controls the tension of the belt 12 which connects the generator with the axle pulley 13. The component of weight which determines the belt tension is adjustable by means of the threaded bolt 14. With a certain tension on the belt, the consequent belt tractive effect will insure that the generator will furnish a certain definite value of current or wattage to the external circuit. This value cannot be exceeded, as above this value the belt will simply slip over the generator pulley.

Figure 2:
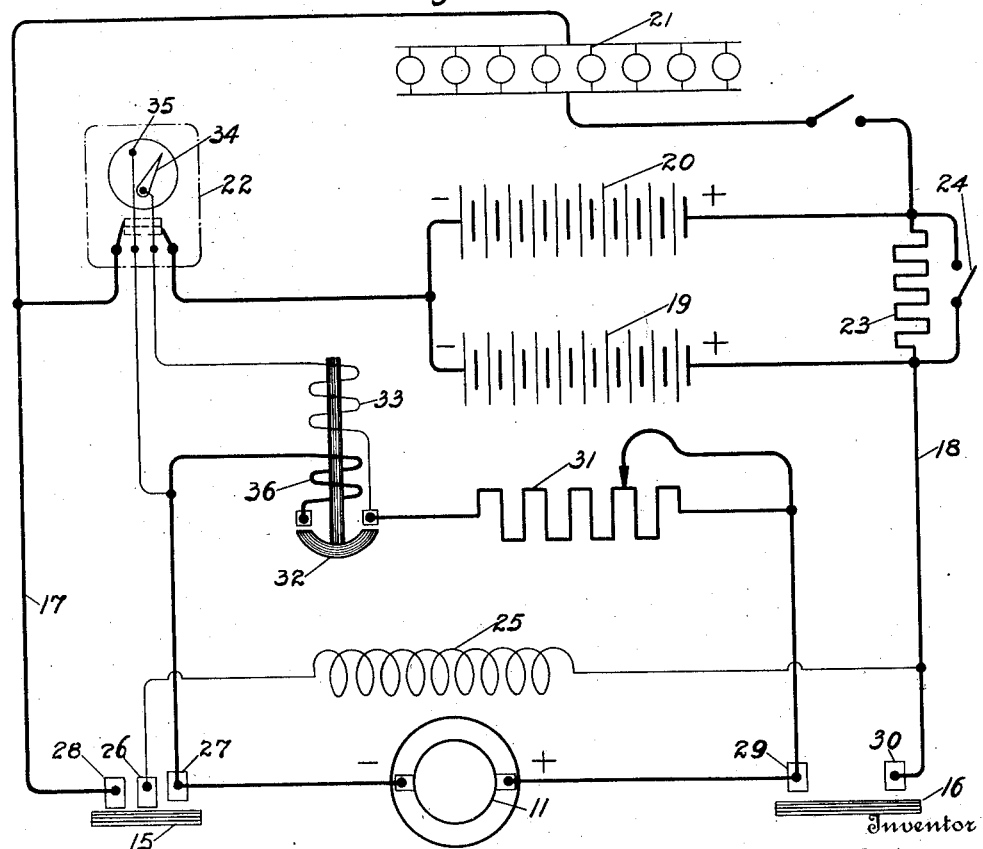
Fig. 2 shows diagrammatically a system embodying the present invention.

Referring now to Fig. 2, the generator 11 is adapted to deliver current through the switches 15 and 16 to the mains 17 and 18. Connected across the mains are the batteries 19 and 20 and the translation circuit 21. The ends of the batteries 19 and 20, having similar polarity, are connected together and are joined to the main 17 through the ampere hour meter 22. The ampere hour meter may be of any preferred type but should automatically change its rate on battery discharge to compensate for battery losses, so that the meter will at all times give a true indication of the net battery charge. The other ends of the batteries 19 and 20 are connected through a resistance 23, which resistance is adapted to be short circuited by means of a switch 24. The field winding 25 of the generator is connected between the main 18 and the contact 26. Adjacent to said contact 26 is a pair of contacts 27 and 28 in the main 17. Contacts 26 and 28 are arranged slightly in advance of contact 27, whereby switch 15 will engage said contacts 26 and 28 in advance of complete contact with contacts 26, 27 and 28. This construction insures the energization of the field winding 25 from the storage battery before circuit from the generator to the main 17 is completed. The switch 16 is adapted to bridge the contacts 29, 30.

Bridged across the generator terminals is a circuit containing the adjustable resistance 31 and the switch 32. The switch 32 is an electro-magnetically operated switch, controlled by the high resistance coil 33, which, when the contacts, 34, 35, of the ampere hour meter are engaged, bridges the contacts of said switch 32. When said switch is closed, it closes the circuit of a holding coil 36.

By means of a centrifugally operated switching mechanism placed on the generator shaft, the batteries 19 and 20 are automatically transposed each time the train stops, so that after the train again starts and the generator attains an effective speed, the battery which just previously was connected across the lamp circuit now becomes the charging battery connected directly across the generator. When the train is at a standstill, the short circuiting switch 24 is closed and the two batteries are connected directly in parallel and furnish their quota of current to the lamp load, each in proportion to its capacity. The switching mechanism which transposes the batteries and operates the switches 15, 16, and 24, is not illustrated for the reason that it forms no part of the present invention, is well known to workers in the art to which this invention appertains and would unnecessarily complicate the drawing. It is sufficient to say that the switches 15 and 16 are closed when the generator is in operation and the switch 24 is closed when the translation circuit is thrown on the batteries only.

A mode of operation of the present invention is as follows:—Starting with the generator at rest, the switch 24 will be closed and the batteries will be connected in parallel to supply the translation circuit. Each will supply its quota, according to its capacity. Furthermore, the more highly charged battery will discharge into the other, equalizing the charges of the two batteries. Net discharge from the two batteries will be registered by the ampere hour meter. When the train starts, the field circuit will be closed and, thereafter, the main switches 15 and 16 will be closed and the switch 24 will be opened. With the battery connections as shown in the drawings, the generator will charge the battery 19 and will also supply the translation circuit through the resistance 23. The battery 20 will act as a regulating battery to maintain a constant voltage on the translation circuit, discharging more or less according as the voltage across the translation circuit tends to vary. Under running conditions, providing no lamps are burning, both batteries are connected in parallel so that they each receive a charge from the generator, the total current from the generator dividing in the two sets of batteries in proportion to their conditions of charge. In any case, the ampere hour meter 22 will register the net charge of the batteries.

When the ampere hour meter registers full charge of the batteries, the contacts 34, 35 will be closed, completing circuit through the coil 33 and closing the switch 32. This action connects the resistance 31 directly across the generator terminals. The current through the resistance 31 will pass through the low resistance coil 36, maintaining the switch 32 in firmly closed position. The high resistance coil 33 is now short-circuited, so that no current passes through same, so that the ampere hour meter contacts in opening, will not be called upon to open a live contact. The value of the resistance 31 may be such that the full current available from the generator, as determined by the belt tension, would flow through same, developing practically the floating voltage of the batteries, and the charged battery would simply float across the circuit, while the other battery would continue to furnish the current demanded by the lamps. This condition would maintain until the train came to a standstill, when the switch 32 would drop out and everything would be restored again to normal condition.

The Stone system ordinarily employs in each battery 12 cells in series and employs 24 volt lamps. The floating voltage of 12 cells of fully charged batteries would be roughly, 25 volts and, assuming that the belt adjustment were such that the generator could develop only 50 amperes, a resistance, 31, of one-half ohm would absorb from the generator just 50 amperes and thus reduce the generator voltage to 25, so that the charged battery would substantially just float across the generator terminals. Obviously, if the field of the generator is operated below saturation so that a constant wattage is produced by the generator, the rising counter E. M. F. of the charging battery will result in a tapering current until the ampere hour meter operates to throw the resistance 31 across the generator. Thereafter, a substantially constant current will be delivered. In the claims appended hereto the word "output" is used broadly to cover either current or wattage output of the generator.

It will be apparent that the improvements embodied in the present invention may be readily applied to the existing Stone systems.

One system has been described and illustrated herein for the purpose of clearly pointing out the principles of the invention, but it is obvious that many modifications may be made which will embody the principles of the invention as defined in the appended claims.

What I claim as new and desire to secure by Letters Patent of the United States is:—

1. In a system of electric distribution, a generator mechanically regulated to provide a constant output, a storage battery to be charged by said generator, an artificial load for said generator, a switch for connecting said load across said generator, said switch being provided with a lifting coil and a holding coil, an integrating meter in the battery circuit, said meter being provided with contacts for completing an energizing circuit for said lifting coil, said switch being adapted to short-circuit said lifting coil circuit.

2. In a system of electrical distribution, a generator regulated to provide a constant output, a translation circuit, a pair of storage batteries, one of which is connected to be charged while the other acts as a regulating battery, said batteries being also adapted to be connected in parallel to supply the translation circuit when the generator is inoperative, means connected in series with said batteries to measure their net charge, and means controlled by said measuring means to throw an artificial load across the generator.

3. In a system of electrical distribution, a generator mechanically regulated to produce a constant output, a translation circuit, a pair of storage batteries, one connected to be charged while the other operates to regulate the translation circuit, said batteries being adapted to be transposed, an integrating meter measuring the net charge of the two batteries, an artificial load adapted to be connected across the generator, and means controlled by said meter for connecting said artificial load across said generator.

4. In combination, a generator, means whereby said generator is regulated to produce a substantially constant output, a translation circuit, two storage batteries, one connected to be charged while the other is connected to the translation circuit, a regulating resistance connecting like poles of said batteries, a load resistance adapted to be connected across the generator of a value to absorb substantially the total current of the generator at the floating voltage of the batteries, and means responsive to battery charge for controlling the circuit of said load resistance.

5. In combination, a variable speed generator, a translation circuit, a pair of storage batteries, one of which is adapted to be charged while the other battery is adapted to regulate the voltage of said translation circuit, said batteries being adapted to be transposed, an integrating meter connected between like terminals of said batteries and one terminal of said generator, and means responsive to said meter for controlling the output of said generator.

6. In combination, a variable speed generator, a translation circuit, a pair of storage batteries, one of which is adapted to be charged while the other battery is adapted to regulate the voltage of said translation circuit, said batteries being adapted to be transposed, means for measuring the net state of said two batteries, and means responsive to said measuring means for controlling the output of said generator.

7. In combination, a variable speed generator, mains connected to said generator, a translation circuit connected across said mains, a battery circuit connected across said mains, said battery circuit containing an integrating meter and two branches each containing a storage battery, one of which is adapted to be charged while the other battery is adapted to regulate the voltage on said translation circuit, said batteries being adapted to be transposed, and means responsive to said meter for controlling the output of said generator.

8. In a system of electrical distribution, a generator, mains connected to said generator, a pair of storage batteries connected across said mains, an integrating meter, one terminal of one of said batteries being connected to a like terminal of the other battery and through said meter to a like terminal of said generator, and a translation circuit connected across one of said batteries through said meter, said meter being adapted to control the output of said generator.

9. In a system of electrical distribution, a generator, a pair of storage batteries and a lamp circuit, one of which batteries is adapted to regulate the lamp circuit while the other battery is being charged, and means responsive to the total state of charge of both batteries for controlling the output of said generator.

10. In a system of electrical distribution, a generator, a pair of storage batteries and a lamp circuit, one of which batteries is adapted to regulate the lamp circuit while the other battery is being charged, an integrating meter adapted to measure the net charge and discharge of both batteries, and means responsive to said meter for controlling the output of said generator.

11. In a system of electrical distribution, a generator, a pair of storage batteries, like terminals of which are connected through a common lead to one side of said generator, an integrating meter in said lead, and means responsive to said meter for controlling the output of said generator.

12. In a system of electrical distribution, a generator, a pair of storage batteries, like terminals of which are connected through a common lead to one side of said generator, an integrating meter in said lead, an artificial load, and means responsive to said meter for connecting said load across said generator.

13. In a system of electrical distribution, a generator, a plurality of storage batteries, a load circuit, connections between said batteries and said generator and load circuit, whereby said batteries may be charged by said generator or may discharge into said load circuit at individually varying rates and in varying amounts, measuring means measuring the net total charge and discharge of both batteries together, and means controlled by said measuring means for causing a discontinuance of the charge to either battery from the generator when the total amount of charge in both batteries equals a predetermined amount.

14. In a system of electrical distribution, a generator, a plurality of storage batteries, a load circuit, connections between said batteries and said generator and load circuit whereby said batteries may be charged by said generator or may discharge into said load circuit at individually varying rates and in varying amounts, automatic means for transposing said battery connections to interchange the respective battery connections in the circuit, and means responsive to the net total charge and discharge of both batteries together for causing a discontinuance of the charge to both batteries when a predetermined net amount of charge has been delivered to the batteries.

15. In a system of electrical distribution, a generator, a pair of storage batteries, like terminals of which are connected through a common lead to one side of said generator, an integrating meter in said lead, and means responsive to said meter for discontinuing the charging of either of said batteries without killing said generator.

16. In a system of electrical distribution, a generator, a pair of storage batteries, like terminals of which are connected through a common lead to one side of said generator, means connecting the other terminals of said battery to the other side of said generator, an integrating meter in said lead, and means responsive to said meter for discontinuing battery charging without killing said generator.

17. In a system of electrical distribution, a generator, a pair of storage batteries and a lamp circuit, one of which batteries is adapted to regulate the lamp circuit while the other battery is being charged, and means responsive to the total state of charge of both batteries for controlling the distribution of the current delivered by said generator.

18. In a system of electrical distribution, a generator, mains connected to said generator, a pair of storage batteries connected across said mains, an integrating meter, one terminal of one of said batteries being connected to a like terminal of the other battery and through said meter to a like terminal of said generator, and a translation circuit connected across one of said batteries through said meter, said meter being adapted to control the distribution of the current delivered by said generator.

In witness whereof, I have hereunto subscribed my name.

WILLIAM A. TURBAYNE.